June 18, 1957     H. M. LEVERETT ET AL     2,795,993
VISION TESTING SET

Filed June 30, 1953     4 Sheets-Sheet 1

INVENTORS
HOLLIS M. LEVERETT
LAWRENCE R. TRAVIS
MILTON R. THORBURN
BY
ATTORNEYS

June 18, 1957  H. M. LEVERETT ET AL  2,795,993
VISION TESTING SET
Filed June 30, 1953  4 Sheets-Sheet 2
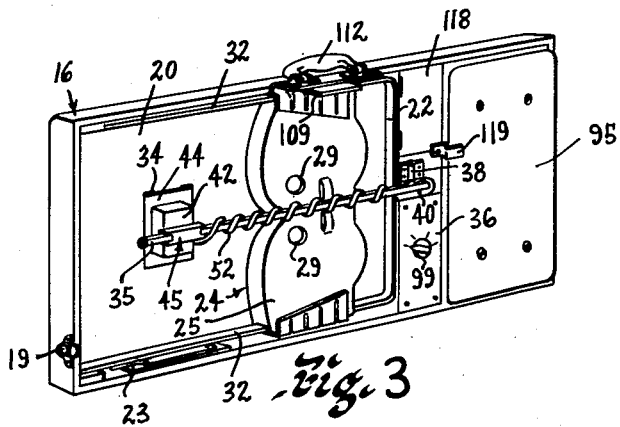
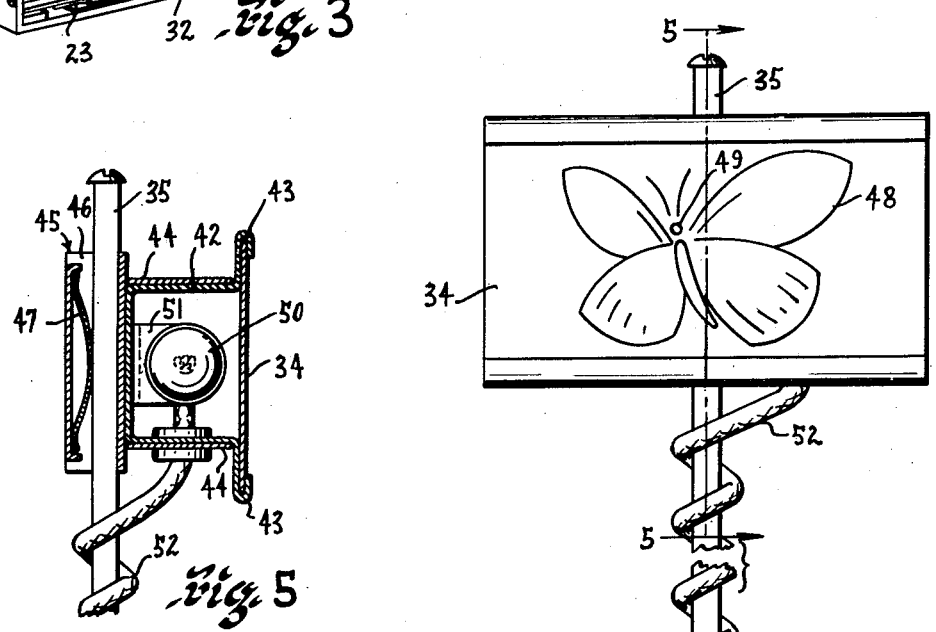
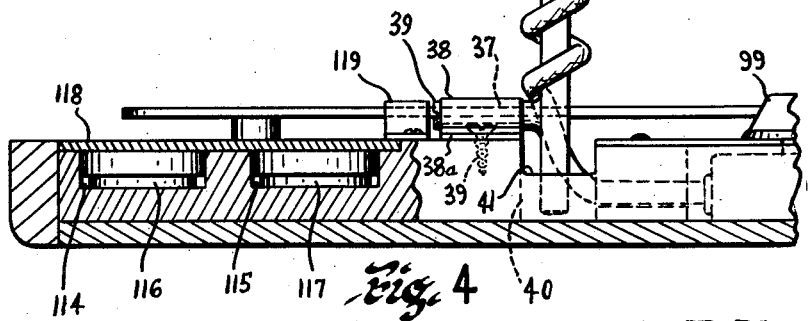
INVENTORS
HOLLIS M. LEVERETT
LAWRENCE R. TRAVIS
MILTON R. THORBURN
BY
ATTORNEYS

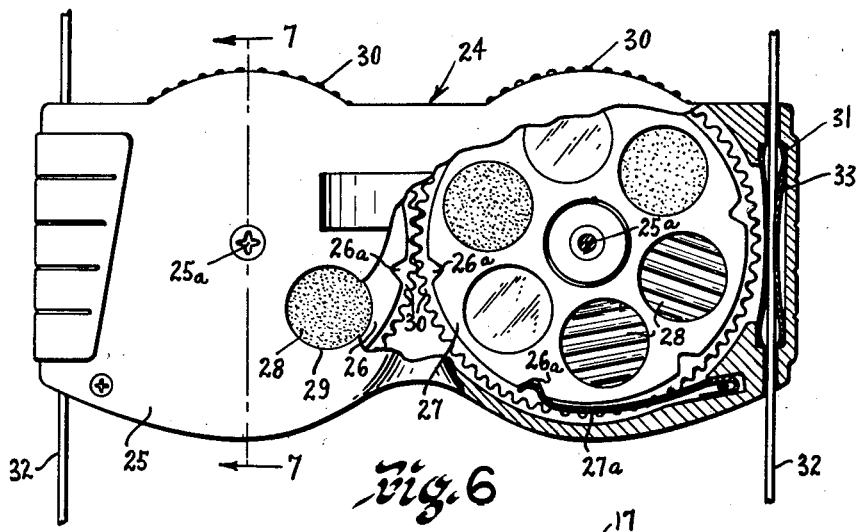
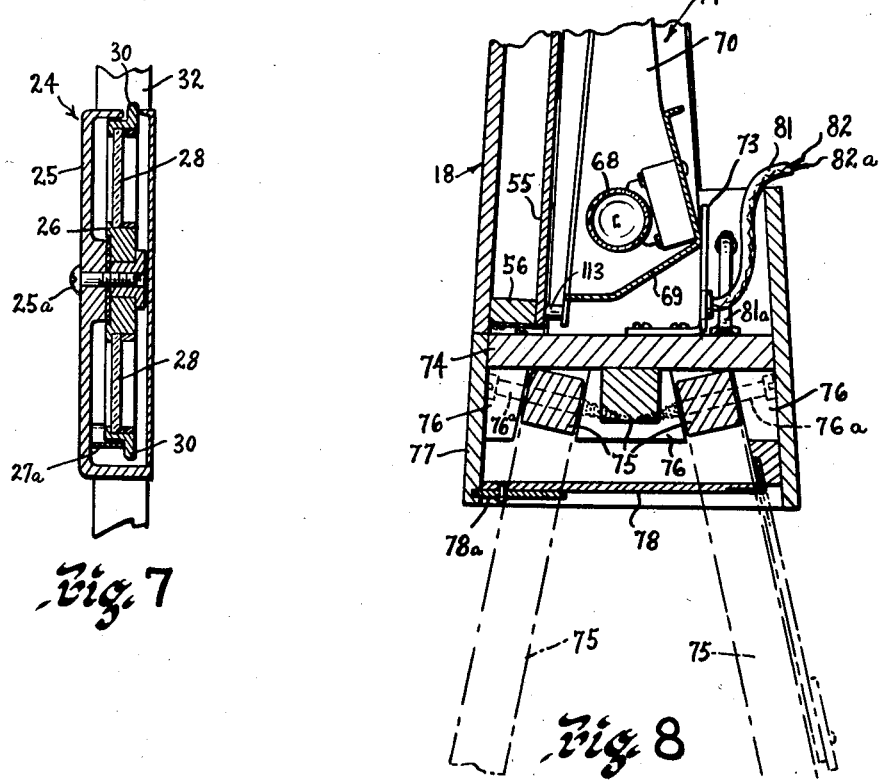

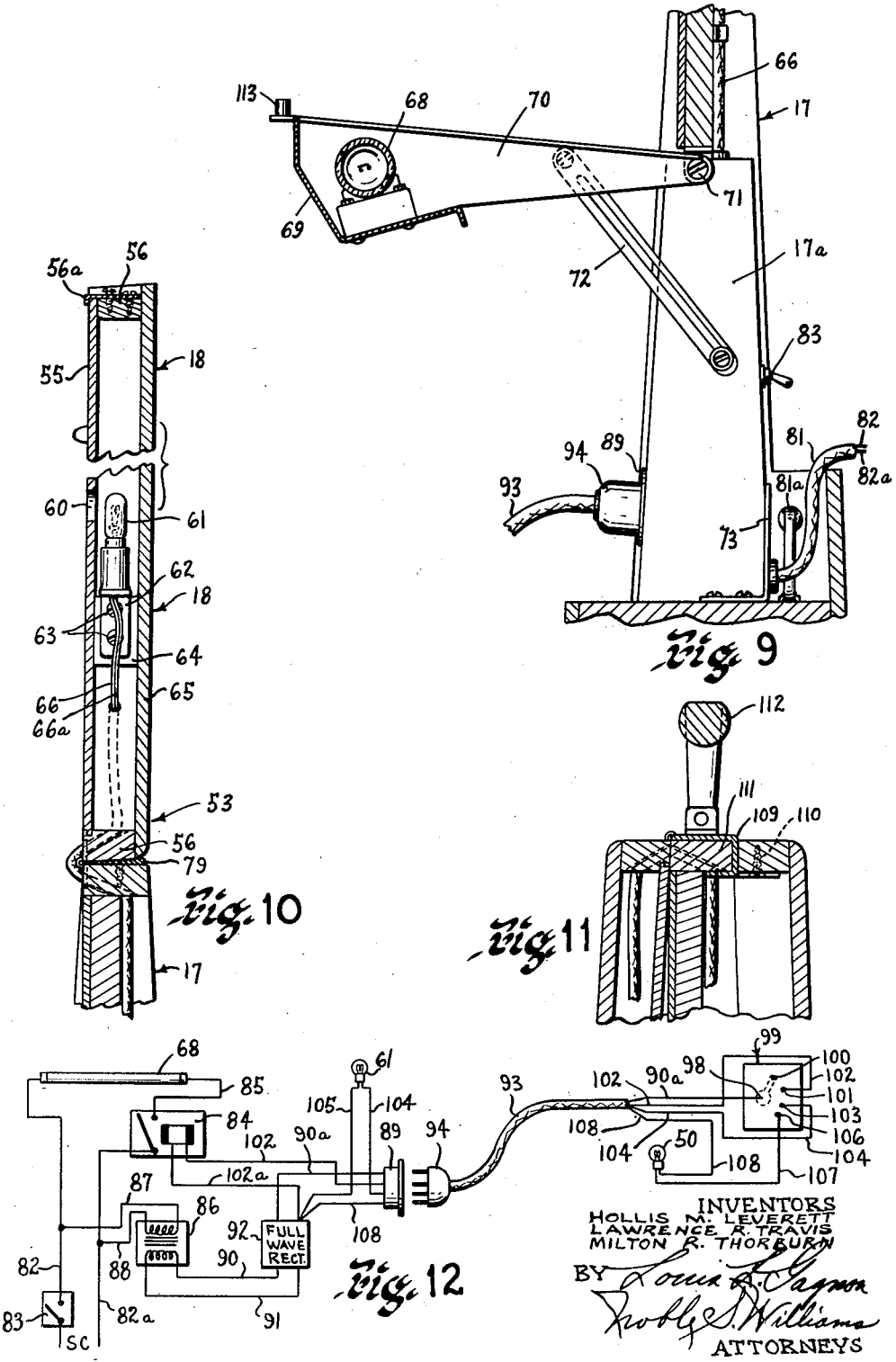

United States Patent Office 2,795,993
Patented June 18, 1957

2,795,993

VISION TESTING SET

Hollis M. Leverett, Wellesley, Mass., and Lawrence R. Travis, Snyder, and Milton R. Thorburn, Williamsville, N. Y., assignors to American Optical Company, Southbridge, Mass., a voluntary association of Massachusetts Application June 30, 1953, Serial No. 365,103

7 Claims. (Cl. 88—20)

This invention relates to vision testing equipment and has particular reference to the provision of vision testing equipment constructed, arranged and assembled in the form of a compact portable kit.

One of the principal objects of the invention is to provide vision testing equipment in the form of a compact portable kit so constructed and arranged that the equipment may be disassembled with a minimum of effort and separable portions thereof located at predetermined relative positions whereby eye testing examinations can be simply and efficiently performed.

Another object is to provide a kit of the above character wherein a completely self-contained desk unit may be separated from a test screen unit and located at a predetermined distance therefrom whereby an examiner, such as a school nurse, and a patient, such as a pupil, to be examined, may be situated adjacent the desk unit, the patient being required to view the test targets through a special vision testing device carried by and forming a part of the desk unit.

Another object is to provide a device of the above character for examining the eyes of patients wherein the vision testing device is formed as a part of said desk unit and is located in a predetermined position thereon whereby the spaced relation of patients' eyes with respect to targets carried by the desk unit and the test screen unit respectively will be definitely established and maintained throughout any number of successive examinations.

Another object is to provide a desk unit of the above character wherein a near phoria test target is positioned so as to be viewed by the patient through an optical device adjustably carried adjacent one end of the unit, said device embodying a plurality of lenses arranged to successively test a patient's vision under various conditions and being of a self-contained type, said device also being used for distance phoria and visual acuity tests.

Another object is to provide a device of the above character embodying electrical illumination sources and electrical circuits therefor which are so arranged that substantially no shock hazard to a patient can at any time occur.

Another object is to provide a device of the above character which is of extreme simplicity in operation whereby possibility of errors on the part of operators is reduced, testing time is shortened, and operator fatigue reduced.

Another object is to provide improved equipment of the above character wherein the test screen unit and desk unit are provided with separate illumination sources which may be controlled entirely by the examiner from his position adjacent the desk unit.

A further object is the provision of a test screen unit of the above character which embodies a target area formed as a relatively fixed immovable part of the unit with an illumination source being provided adjacent the target area and shielded from the direct view of the patient for illumination of a portion of the surface thereof whereby visual acuity tests can be made, and with additional spot illumination being provided within said target area and in the direct view of the patient whereby distance phoria tests can be made.

A still further object is to provide equipment of the above character which embodies suitable compartments to accommodate the equipment necessary for use therewith in an orderly and compact manner with complete protection against damage being provided during transportation of the equipment or storage thereof when not in use.

Other objects and advantages of the invention will become apparent from the following description taken in connection with the accompanying drawings, in which:

Fig. 3 is a perspective view of the desk unit with the parts thereof in closed relation;

Fig. 4 is an enlarged fragmentary view partly in section illustrating particularly the near phoria test target arrangement;

Fig. 5 is an enlarged vertical sectional view taken as on line 5—5 of Fig. 4 looking in the direction of the arrows;

Fig. 6 is an enlarged front elevational view partly in section of the eye testing device;

Fig. 7 is a vertical sectional view taken as on line 7—7 of Fig. 6 looking in the direction of the arrows;

Fig. 8 is an enlarged fragmentary vertical sectional view through a portion of the test screen unit showing the parts in closed relation;

Fig. 9 is an enlarged fragmentary vertical sectional view taken substantially on line 9—9 of Fig. 1 looking in the direction of the arrows;

Fig. 10 is an enlarged vertical sectional view taken substantially on line 10—10 of Fig. 1 looking in the direction of the arrows;

Fig. 11 is an enlarged fragmentary vertical sectional view taken substantially on line 11—11 of Fig. 2 looking in the direction of the arrows; and Fig. 12 is a schematic wiring diagram for the device.

Vision test equipment of the character disclosed herein has found wide acceptance for use in providing for a general examination of patients' eyes. Such equipment when formed as a compact portable kit may be easily transported and used for such examinations particularly in schools and the like wherein it is desired that a general examination of patients' eyes be made with the objective of ascertaining whether or not a patient is in need of an additional and more thorough examination and possible treatment by a doctor or optician.

Kits of this type and as disclosed by the prior art have, however, generally been of a somewhat complicated, inefficient nature sometimes requiring the use of many separate appurtenances which may become easily damaged, misplaced or lost.

The present invention overcomes the above and other objections through the provision of an easily knockeddown and assembled kit wherein the only separable portion is a desk unit which is adapted to be placed upon a desk or table and adjacent to which a patient is required to be positioned. In the presently described arrangement the vision testing means is a self-contained device which is easily operable by the examiner and which may be used for visual acuity, distance phoria, near phoria and other tests. The device as presently disclosed includes a source of illumination for a visual acuity target and separate adjustable illumination sources for the distance phoria test screen and for the near phoria test target. Specially designed compartments are provided for efficiently receiving the various parts of the device including reels or other means on which the various wires of the electrical circuits are adapted to be wound when not in use. When assembled the entire equipment resembles a neat, compact arrangement which may be easily carried, the complete device being relatively light in weight.

Figure 2:
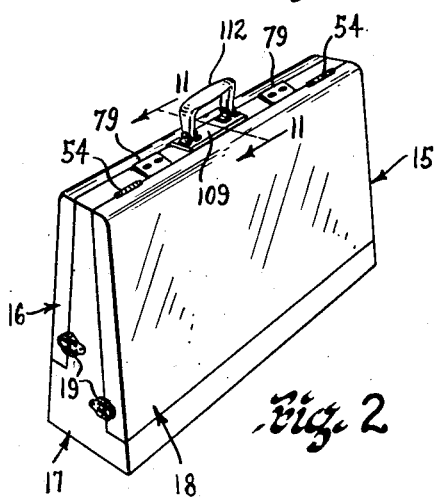
Fig. 2 is a perspective view of the kit showing it in assembled relation for storage or transportation.

Referring in particular to the drawings, wherein like characters of reference designate like parts throughout the several views, numeral 15 (Fig. 2) denotes a carrying case having a shape generally similar to a suitcase or similar luggage which may be made of wood or other light weight material and which may be covered by any suitable fabric or other decorative material whereby the device will be neat and attractive in appearance. The carrying case 15 is divided into three portions, namely a detachable portion or member 16, a main body portion or member 17 and a movable cover portion or member 18 which are shaped to interfit with one another as shown in Fig. 2 and to be securely connected by means such as hasps 19 whereby they may be disconnected when desired by an examiner.

Figure 1:
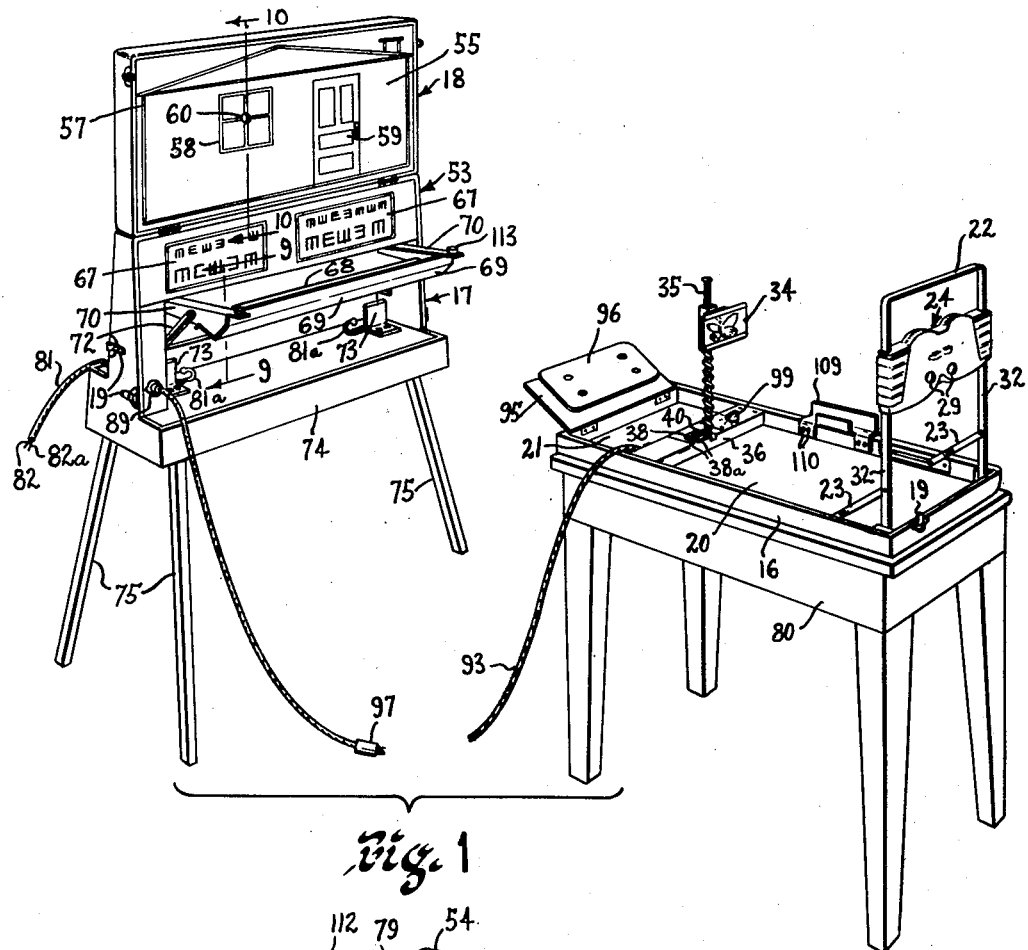
Fig. 1 is a composite perspective view showing the desk unit and test screen unit located in their respective positions of use.

The portion 16 forms a desk unit which is shown in detail in Figs. 1 and 3 and which comprises a tray in which is a large compartment 20 and a smaller compartment 21. At the forward end of the large compartment 20 is provided an inverted U-shaped stand 22 which is hinged to the inner walls of the compartment 20 and adapted to be supported in upright position by means of hinge arms 23. The stand 22 has slidably mounted for vertical movement thereon an eye testing device 24 which comprises a housing 25 (Fig. 6) which contains a pair of discs 26 and 27, the discs 26 and 27 being located in edge-to-edge relation and each carrying therein a plurality of lenses 28 of varying optical properties. The housing 25 is provided with a pair of spaced openings 29 before which a patient is required to position his eye. The discs 26 and 27 are provided throughout their peripheries with teeth 30 and are constantly in mesh with one another, the discs 26 and 27 being rotatably mounted in the front wall of the housing 25 on pivot members 25a for simultaneous rotation about said respective pivot members when operated by the examiner. The housing 25 is provided with a pair of spaced openings in its upper side through which extend restricted areas of the teeth 30 on the respective discs, which teeth 30 thus form means whereby the examiner can easily rotate the discs and thus position respective lenses 28 in the openings 29. A pair of spring detents 27a are carried by the device for engagement with the respective discs 26 and 27, which discs are provided with a plurality of notches 26a, one for each lens 28, for receiving the detents 27a whereby the discs will be retained in adjusted positions. Thus, the patient is required to look through the lenses 28. Adjacent each end of the eye testing device 24 are provided vertically extending openings 31 (Fig. 6) which are adapted to receive the opposed arm portions 32 of the stand 22, spring means 33 being disposed within the openings 31 for frictionally engaging the arm portions 32 whereby the device 24 can be moved longitudinally of the arm portions 32 and will be retained in its adjusted position through the action of the spring means 33.

A patient having his eyes at the openings 29 will be required to view a near phoria test target 34 (Figs. 1, 3, 4 and 5) which is carried in predetermined spaced relation with the eye testing device 24 on an upright 35, which upright 35 has one end pivotally attached to horizontally disposed portion 36 of the desk unit 16, the portion 36 forming a division between the compartments 20 and 21. The lower end of the upright 35 is provided with a laterally extending pivot member 37 (Fig. 4) which is adapted to be rotatably positioned within a tubular member 38 which has flat side portions 38a which are attached as by screws 39 or the like to the separating portions 36. The outer end of the pivot member 37 has mounted therein a headed stud 39 which prevents removal of the pivot member 37 from the tubular member 38. Thus, the upright 35 can be manually lifted into upright position by causing pivotal movement of the pivot member 37 in the tubular member 38. A recess 40 is provided in the separating portion 36 for receiving the adjacent end of the upright 35 when the said upright is in an upright position, a portion 41 thereof being adapted to be engaged by the end of the upright 35 for preventing it from being moved rearwardly to a greater extent than is desired.

The target 34 encloses the front of a box-like lamp housing 42, the housing 42 having its upper and lower front edges folded into overlying relation as illustrated in Fig. 5 so as to form substantially parallel grooves 43 for slidably receiving the upper and lower edges of the target 34. The lamp housing 42 is fixedly secured to the forwardly extending arms 44 of a bracket 45, the base portion 46 of which is hollow and adapted to receive the upright 35. The hollow base portion 46 of the bracket 45 also contains a spring device 47 which continually frictionally engages the upright 35. Thus, the bracket 45 and housing 42 can be adjusted longitudinally of the upright 35 and yieldably retained in adjusted position by the spring device 47.

The target 34 is preferably opaque and has a design imprinted thereon which is preferably of such a nature as to tend to maintain interest of the patient. A design which has been found to be particularly suitable for school children is the butterfly 48, shown in Fig. 4, which has as its head a small opening 49. The opening 49 is aligned with a lamp 50 removably carried by a lamp bracket 51 within the housing 42. The lamp 50 is provided with electrical current through a lead 52 which is wound around the upright 35 in such a manner as to permit the lamp to be adjusted longitudinally of the upright 35 as described without binding.

The remaining portions 17 and 18 of the kit 15 comprise the test screen unit 53 (Figs. 1, 8, 9 and 10). The portion 18 of the unit 53 is adapted to be swung upwardly on hinges 54 to a position wherein the adjacent edges of the portions 17 and 18 are super-imposed as shown in Fig. 1. The portion 18 is formed as a box-like structure having as its front a test target or screen 55 which is removably secured to the sides 56 of the structure by clips 56a or other suitable means. The screen 55 is preferably formed of substantially rigid material such as wood, sheet metal, plastic or heavy paper, is opaque, and has imprinted thereupon a suitable design preferably in the form of a representation of a house 57 having therein a window 58 and a door 59. In the center of the window 58 is a small opening 60 which is aligned with a lamp 61 carried within the portion 18 by means such as a bracket 62 secured as by screws 63 or the like to a block 64 carried by the back wall 65. The lamp 61 is adapted to be provided with electrical current through leads 66 and 66a which extend downwardly into the lower portion 17 of the unit 53.

The front of the lower portion 17 of the device is provided with visual acuity targets 67 which are adapted to be illuminated by means of a lamp 68. The lamp 68 is carried within a receptacle 69 which has at its ends arms 70 which are hinged as at 71 (Fig. 9) to the inner sides 17a of the portion 17. Means such as hinge arms 72 are attached to the arms 70 of the receptacle 69 and to the sides 17a of the portion 17 for retaining the lamp receptacle swung outwardly in position of use as shown in Fig. 9. However, when not in use, the receptacle 69 is adapted to be swung downwardly upon release of hinge arms 72 to substantially the position shown in Fig. 8 wherein it will be located within portion 17 beneath the targets 67. Angled stop members 73 are secured to the base portion 74 of the device against which the receptacle is adapted to abut when in its closed position.

When the receptacle 69 and lamp 68 are swung upwardly to position of use the lamp 69 will illuminate the targets 67 whereupon a patient having his eyes positioned at the eye testing device can be examined as to visual acuity. The patient can be given a distance phoria test by the upper target 57 which should be illuminated by room light only.

In using the device, an examiner will first remove the desk unit 16 and will set up the test screen unit 53 by swinging the legs 75 downwardly to the positions shown by dot-dash lines in Fig. 8. The legs 75 are pivotally connected to blocks 76 attached to the under side of the base 74 by screws 76a and are normally retained in a box-like portion 77 provided therefor on the under side of the base, with means such as a pivoted arm 78 having a latch 78a thereon for engaging a groove in the adjacent wall of the portion 77 being used to prevent accidental displacement of the legs 75 during transportation. Then the upper portion 18 of the unit 53 is swung upwardly to edge-to-edge relation with the portion 17. It will be understood here that wedges 79 (Figs. 2 and 10) may be fixedly secured to the upper edge of the portion 17 whereby the adjacent edge of the portion 18 will abut against the wedges 79 and thus will be located in desired vertical position. The illumination source 68 for the visual acuity targets 67 will be swung upwardly to position of use as shown in Fig. 9. Then the desk unit 16 is placed upon a table 80 or other suitable support as shown in Fig. 1 and the eye testing device 24 swung upwardly to its position of use.

Within the lower portion 17 of the test screen unit 53 is located some of the electrical equipment. The unit 53 is adapted to be set up adjacent a wall plug or similar source of electrical current. A cable 81 is normally wound on hooks 81a provided therefor in the lower part of the unit 53. Leads 82—82a (Figs. 1, 8, 9 and 12) in the cable 81 may be connected to the entrance whereupon current will be permitted to flow to the device upon closure of a switch 83 in one of the leads 82—82a. Lead 82 is connected directly with one side of the lamp 68 while lead 82a is connected with a relay 84. The relay 84 is adapted, when operated, to permit A. C. current to flow through lead 85 to the other side of the lamp 68. A step-down transformer 86 is connected by leads 87 and 88 respectively to leads 81 and 82 and have passing therefrom to a rectifier 92 a pair of leads 90 and 91. The rectifier 92 is used for changing the A. C. current to D. C. current. Thus, D. C. current only will flow to the receptacle 89. Although 110 volts A. C. current is used for illumination of the lamp 68, it is desirable that current of very low voltage be used for the remainder of the circuits. Therefore the step-down transformer 86 is provided for the purpose of stepping down the current to 6–8 volts.

This permits a relatively small four-wire cable 93 having a plug 94 for insertion in receptacle 89 to be used to electrically connect the test screen unit 53 with the desk unit 16. The compartment 21 in the desk unit 16 is provided with a cover 95 having on its under side a reel 96 on which the cable 93 is normally wound. When the cable 93 is wound on the reel 96 and the cover 95 is closed, the cable is maintained safely within the compartment 21.

It is to be noted here that for examination a patient's eyes should be located approximately twenty feet from the screen 55. To accurately establish this distance the cable 93 is provided with a marker 97 thereon at a predetermined position whereby when the cable is extended between the units 53 and 16 the marker 97 will definitely establish the desired twenty feet distance between the eye testing device 24 and the screen 55. The cable 93 is, however, provided with extra length whereby after the measurement is completed the cable 93 may be allowed to drop to the floor and thus not be stretched tautly between the units where it may be accidently contacted by an unwary person in which event one or both of the units could be knocked over and possibly damaged.

Lead 90a which passes from rectifier 92 passes to the receptacle 89 and then through plug 94 to the main terminal 98 in a four-way switch 99 which is located in the separating portion 36 of the desk unit 16. The switch 99 is preferably of a rotary type having an off position indicated by numeral 100 in Fig. 12.

A patient will be seated at the desk unit 16 with his eyes at the openings 29 in the eye testing device 24, which device is adjusted vertically in accordance with the patient's heighth. The first of a sequence of tests is accomplished by operating the eye testing device 24 to position an occluder before the left eye with either no lens or a lens of clear glass being positioned before the right eye. At this time the operator will rotate switch 99 to the position indicated by numeral 101 in Fig. 12. This will close the circuit from terminal 98 to lead 102 which allows current to pass to the relay 84 and thence back by way of lead 102a to the rectifier 92, whereupon the relay 84 will be operated to permit illumination of lamp 68. Lamp 68 will illuminate the visual acuity targets 67 and thus the examiner will test the patient for right eye acuity.

Left eye acuity is checked in the second stage of the examination wherein the eye testing device 24 is operated to occlude the right eye while permitting the left eye to view the visual acuity targets 67.

The third stage of the examination is performed by operating the eye testing device 24 so as to occlude the left eye and to position a plus lens of predetermined power before the right eye and examining for visual acuity. The fourth stage of the examination similarly tests the left eye for visual acuity with a plus lens positioned therebefore while the right eye is occluded. This concludes the visual acuity tests.

In the fifth stage of the examination the eye testing device 24 is operated to present before the left eye a clear lens while positioning before the right eye a Maddox rod. At this time, the switch 99 is operated to close the circuit to the third contact 103 which permits current to flow from terminal 98 through lead 104 to the distance phoria test bulb 61 which is located behind the screen 55 of the test screen unit 53. The circuit to the lamp 61 is completed through lead 105 back to the rectifier 92, whereupon the lamp 61 will be lighted. The lamp 61 is visible as a small source of illumination to the left eye of the patient through the clear lens; however, the right eye of the patient envisions the light from lamp 61 as a line, which line, if the eyes are normal, passes through the lamp 61. However, if the vertical line does not pass through the spot of light seen by the left eye it is apparent that there is a degree of muscular imbalance in one meridian.

For the sixth stage of the examination the eye testing device 24 will be operated to position another Maddox rod before the right eye and extending in a direction at right angles to the line seen in stage five. Thus, muscular imbalance in the opposite meridian can be tested.

If the patient's eyes are found to be satisfactory for all of the above tests, he is then examined using the near phoria target 34. The switch 99 is operated by the examiner to cause current to flow from terminal 98 through contact 106, then through lead 107 to the lamp 50, and then from the lamp 50 through lead 108 to the rectifier 92 to complete the circuit and illuminate lamp 50. The eye testing device 24 is operated to position the Maddox rods before the right eye as in the foregoing stages 5 and 6. In this way the eyes are tested for muscular imbalance as the patient views the light from lamp 50 through the Maddox rods and reports on the position of the line created by the Maddox rods relative to the lamp 50.

If it is found as the tests progress during the examination of the eyes of a patient that any one stage results in an unsatisfactory report with respect to the vision of the patient, the following stages are eliminated since an unsatisfactory report at any one of the stages will indicate to the examiner that the patient needs a more thorough eye examination and possible treatment.

The desk unit 16, after the tests are completed and the cords wound on their respective reels and hooks, is then assembled with the test screen unit 53. One edge of the desk unit 16 is provided with a channeled member 109 (Figs. 1, 2 and 11) which is secured thereto as by screws 110 or the like in such a manner that when assembling the desk unit 16 with the test screen unit 53 the adjacent edge 111 of the test screen unit 53 will be positioned in the channeled member 109 as shown best in Fig. 11. Then the hasps 19 are fastened and the legs 75 are retracted whereupon a handle 112 pivotally attached to the channeled member 109 can be used to carry the kit in the conventional manner.

In assembling the units, the hinge arms 72 are released to allow the lamp 68 and receptacle 69 to swing downwardly to a position within the portion 17 of the test screen unit 53 wherein the back of the receptacle 69 will engage the stops 73 provided therefore. The front edge of the receptacle 69 is provided with resilient bumpers 113 thereon against which the inner surface of the portion 18 of the test screen unit 53 rests when the portion 18 is swung downwardly to closed relation with portion 17. Thus, the lamp 68 and receptacle 69 are prevented from free swinging movement during transportation, which movement might cause damage to the lamp.

It is to be understood that the plus lenses 28 which are used in visual acuity test stages three and four may be of any selected power. However, it is desirable to use a different power lens for small children than is used for older children. Therefore, the separating portion 36 of the deck unit 16 is provided with a pair of cavities 114 and 115 (Fig. 4) for storage of auxiliary lenses 116 and 117 to be substituted when desired for the plus lenses in the eye testing device 24. A cover 118 is hingedly connected to the separating portion 36 and adapted, when closed, to retain the lenses 116 and 117 in the cavities 114 and 115, with a pivoted latch 119 being attached to the separating portion 36 in such a manner that it will prevent accidental opening of either the cover 118 or the cover 95 of the compartment 21.

From the foregoing it is apparent that all of the objects and advantages of the invention have been accomplished. However, it is apparent that many changes may be made in the arrangement of parts shown and described without departing from the spirit of the invention. Therefore, it is to be understood that all material shown or described should be interpreted as illustrative and not in a limiting sense.

Having described our invention, we claim:

1. A portable kit for use in testing vision comprising a main member carrying a target area embodying means for testing distant visual acuity and for distant phoria tests, a step-down transformer on said main member, a high intensity source of illumination for illuminating the target area and shielded from the direct view of the patient, a conductor of electric current for connecting said transformer and said high intensity source of illumination to a source of current, a switch means for controlling said source of illumination, a detachable member detachable from said main member and adapted to be positioned adjacent said patient's location carrying a near vision relatively low voltage and intensity spot source of illumination for near phoria tests, and electrical control means carried by said detachable member and operated with current from said step-down transformer for selectively actuating said switch to light, said high intensity source of illumination or connecting said low intensity spot source of illumination for energization by low voltage current from said transformer.

2. A portable kit as claimed in claim 1 in which said electrical control means comprises a plurality of contacts serially operated to effect illumination of said testing means in a predetermined sequence.

3. A portable kit for use in testing vision comprising a main member carrying a target area embodying means for testing distant visual acuity and having a low intensity spot source of illumination for distant phoria tests, a high intensity source of illumination for illuminating the target area and shielded from the direct view of the patient, a step-down transformer in said main member, a conductor of electric current for connecting said transformer to a source of current, a circuit provided with electrically controlled switch means for connecting the line voltage of said conductor to said high intensity source of illumination, a detachable member detachable from said main member and adapted to be positioned adjacent said patient's location carrying a near vision relatively low voltage and intensity spot source of illumination for near phoria tests, and electrical control means carried by said detachable member and operated with current from said step-down transformer for connecting said high intensity circuit to said conductor and for selectively connecting one or the other of said low intensity spot sources of illumination for energization by low voltage current from said transformer.

4. A portable kit for use in testing vision comprising a portable carrying case having a main body portion and a separable desk portion, said main body portion carrying a target area for testing distance visual acuity and a target area for distance phoria tests, a source of illumination for said visual acuity target area, a relatively low voltage and intensity spot source of illumination within said phoria target area, said desk portion being adapted to be positioned for use at a predetermined distance from the aforesaid distance target areas and carrying pivotally fixed thereto a frame member having a pair of sight openings, means for mounting a near phoria target area with a relatively low voltage and intensity spot source of illumination on said desk portion, electrical means including a step-down transformer and control means supplied with low-voltage current therefrom for delivering in predetermined sequence line voltage to said source of illumination for said visual acuity target area and low-voltage current to one and to the other of said low intensity spot sources of illumination, and means on said frame for selectively positioning lenses in each of said sight openings for tests in cooperation with at least said distance and near phoria target areas, said control means being carried by said desk portion and said frame member being foldable to a position within said desk portion and to an upright position of use.

5. A portable kit for use in testing vision comprising a portable carrying case having a main body portion and a separable desk portion, said main body portion carrying a target area for testing distance visual acuity and a target area for distance phoria tests, a source of illumination for said visual acuity target area, a relatively low voltage and intensity spot source of illumination within said phoria target area, said desk portion being adapted to be positioned for use at a predetermined distance from the aforesaid distance target areas and carrying pivotally fixed thereto a frame member having a pair of sight openings, means for mounting a near phoria target area on said disk portion, electrical means including conductors for providing said last mentioned phoria target area with a relatively low voltage and intensity spot source of illumination, means on said frame for selectively positioning lenses in each of said sight openings for tests in cooperation with at least said distance and near phoria target areas and being foldable to a position within said desk portion and to an upright position of use, a step-down transformer carried by said main body portion and electrical control means carried by said desk portion and operated with current from said step-down transformer for delivering line voltage to said source of illumination for the distance visual acuity target area and for selectively connecting the low voltage current of said transformer to one or the other of said spot sources of illumination.

6. A compact, lightweight, readily portable unit for use in testing vision comprising a member having a base, recessed side portions and an intermediate upright portion, a cover member secured to the upper end of said intermediate upright portion and being shaped and dimensioned to be folded into fitted relation with one of said recessed side portions and a detachable member shaped and dimensioned to fit within the other of said recessed portions so as to form with said main member a closed hollow container, test means positioned within the cover member and test means positioned within confines of the upper portion of the intermediate upright portion, all said test means lying substantially in a single plane when the cover is in an open upright position, a receptacle adjustably connected to said intermediate upright portion beneath the test means within the confines of said portions and having a lamp therein, said receptacle being so disposed as to illuminate the front surface of said test means and the test means in the cover member when moved to an extended operative position, a step-down transformer in said main member, a conductor for supplying electric current for energizing said lamp and said transformer, said detachable member having additional test means embodying a second source of illumination therein, means for supporting said additional test means for movement to a position to lie within said detachable member and to an upright position relative thereto, means for connecting said second source of illumination with the low voltage side of said transformer when said detachable member is spaced from said main member, an adjustable frame member spaced relative to said additional test means and being carried by and foldable to a position within said detachable member and to an upright position of use relative thereto, said frame member having a housing adjustably connected therewith and having a pair of sight openings in said housing, a pair of rotatable cells in said housing having an operable connection with each other whereby movement of one of said cells will cause simultaneous movement of the other, and lenses in said cells movable thereby into alignment with said sight openings and each cooperating with at least one of said test means.

7. A compact, lightweight, readily portable unit for use in testing vision comprising a main member having a base, recessed side portions and an intermediate upright portion, a cover member secured to the upper end of said intermediate upright portion and being shaped and dimensioned to be folded into fitted relation with one of said recessed side portions and a detachable member shaped and dimensioned to fit within the other of said recessed portions so as to form with said main member a closed hollow container, test means positioned within the cover member and test means positioned within confines of the upper portion of the intermediate upright portion, all said test means lying substantially in a single plane when the cover is in an open upright position, said test means embodying means for testing distant visual acuity and having a low intensity spot source of illumination for distant phoria tests, a lamp receptacle adjustably connected to said intermediate upright portion beneath the test means within the confines of said portions and having a relatively high intensity source of illumination therein, said receptacle being so disposed as to illuminate the front surface of said test means and the test means in the cover member when moved to an extended operative position, a relatively high voltage source of electrical energy for energizing said high intensity source of illumination, a step-down transformer energized by said high voltage source and functioning as means for producing a source of relatively low voltage, said detachable member having additional test means embodying a second relatively low intensity source of illumination therein, means for supporting said additional test means for movement to a position to lie within said detachable member and to an upright position relative thereto, conductive means for connecting said low intensity sources of illumination with said source of relatively low voltage, electrical control means for selectively energizing said low intensity sources of illumination and for separately controlling the energizing and de-energizing of said high intensity source of illumination, an adjustable frame member spaced relative to said additional test means and being carried by and foldable to a position within said detachable member and to an upright position of use relative thereto, said frame member having a housing adjustably connected therewith and having a pair of sight openings, a pair of rotatable cells in said housing having an operable connection with each other whereby movement of one of said cells will cause simultaneous movement of the other, and lenses in said cells movable thereby into alignment with said sight openings for cooperation with at least said low intensity spot sources of illumination.

References Cited in the file of this patent
UNITED STATES PATENTS

| | | |
|---|---|---|
| 718,293 | Waits | Jan. 13, 1903 |
| 1,719,733 | Shore | July 2, 1929 |
| 1,749,612 | Scott | Mar. 4, 1930 |
| 1,920,428 | Pank | Aug. 1, 1933 |
| 2,240,156 | Feldman | Apr. 29, 1941 |
| 2,466,958 | Long | Apr. 12, 1949 |
| 2,478,662 | Long | Aug. 9, 1949 |